UNITED STATES PATENT OFFICE.

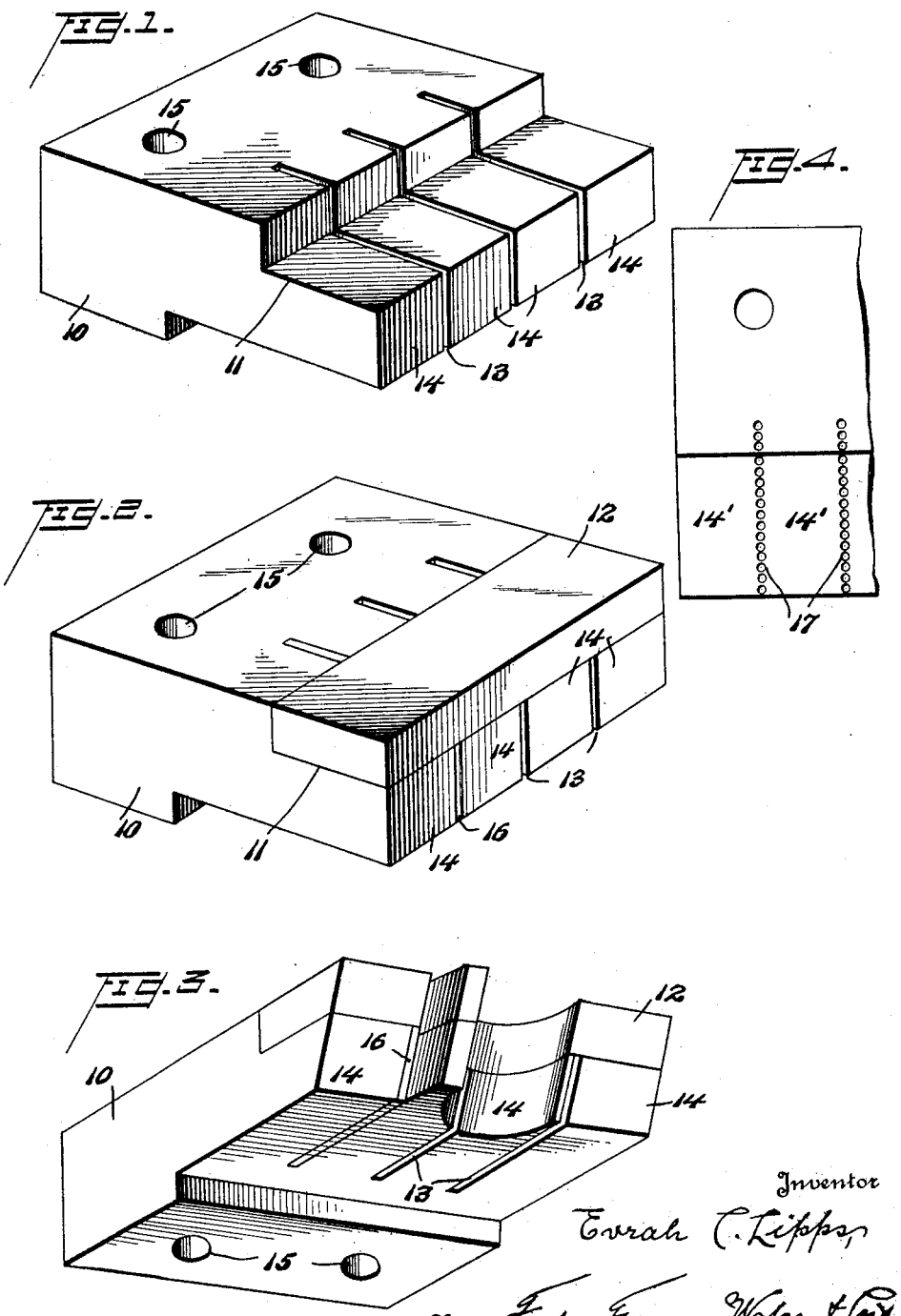

EVRAH C. LIPPS, OF DETROIT, MICHIGAN, ASSIGNOR TO PACKARD MOTOR CAR COMPANY, OF DETROIT, MICHIGAN, A CORPORATION OF MICHIGAN.

METAL TOOL.

1,399,219.  Specification of Letters Patent.  Patented Dec. 6, 1921.

Original application filed November 9, 1917, Serial No. 201,143. Divided and this application filed January 22, 1920. Serial No. 353,350.

*To all whom it may concern:*

Be it known that I, EVRAH C. LIPPS, a citizen of the United States, and residing at Detroit, Wayne county, State of Michigan, have invented certain new and useful Improvements in Metal Tools, of which the following is a specification.

The present application which is a division of my application 201,143 filed Nov. 9, 1917, relates to the art of metal working and more particularly to a tool made by integrally uniting a plurality of pieces of metal.

Heretofore, as far as I am aware, it has not been possible to electrically weld by the resistance method two pieces which differ in size or properties, by a series of spot welds, where the weld desired exceeds in area the capacity of the machine. In other words a machine having a capacity to weld an area up to one square inch, could not be utilized to weld an area of four square inches by making four successive welds. Where the pieces differ in size, or properties such as the specific electrical resistance, one of the pieces will reach a welding heat and burn before the other reaches such heat, if indeed the latter piece reaches a weld heat at all. According to the present invention, however, these difficulties have been overcome so that pieces having different characteristics as mentioned above may be integrally joined by a series of electrical spot welds, to form a tool or other instrument.

The objects and features of the invention will be apparent from the description taken in connection with the drawings in which:

Figure 1 is a perspective view showing a piece of metal adapted to form the stock of a tool, prepared to have a second piece welded thereto, the preparation consisting in forming grooves, slots, or air gaps;

Fig. 2 is a perspective view showing the two pieces welded together and one of the air gaps filled up;

Fig. 3 is another perspective view illustrating the tool formed from the welded-together-pieces; and Fig. 4 is a partial plan view showing an alternative method of preparing the piece of metal or stock shown in Fig. 1.

Referring to the drawings, a piece of metal 10, which is shown as adapted for the body of an instrument, is formed with a seat 11 at an edge portion thereof to receive another piece of metal 12. In the case of a tool the body may be a cheap or low grade steel such as a carbon, machinery, or cheap alloy steel and the piece 12 is preferably a wear resisting steel such as a high speed or higher grade alloy steel. Extending transversely of the seat are a plurality of spaced grooves, slots or air gaps 13, thus dividing a portion of the piece 10 into sections 14. The slots 13 act to electrically and thermally insulate the sections 14 from each other. The stock of the tool may be formed with holes 15 to coöperate with pins or bolts to hold the same in a machine.

In order to join the piece 12 of alloy or high speed steel to the stock, the former is placed on the seat 11 of the stock and the two pieces secured in an electric welding machine, one terminal of the welding circuit being connected to a section 14 and the other terminal being placed on the piece 12 directly over the said section, the machine having at least a capacity to weld an area equal to the top surface of the section. The circuit is then closed and the current passing from the section 14 through the piece 12 raises the contacting surfaces to welding heat and fuses them together. The size of the sections 14, or in other words, the number of air gaps formed in the stock to extend transversely of the piece 12 depends on the capacity of the machine, the sections being formed as to provide welding surfaces within the capacity of the machine.

After having welded together one of the sections 14 and the piece 12, the other sections are successively welded to the piece 12. The resulting product is illustrated in Fig. 2, and may be machined or worked to give a tool of any desired shape, one form being shown in Fig. 3.

If it is desired to compensate for the loss of strength due to the slots 13, they may be filled up with a suitable material, as shown at 16 in Figs. 2 and 3. If a metal filler is used it may be welded to the surrounding metal by the acetylene process or in any other desired manner.

Instead of preparing the piece 10 by slotting the same, I may form rows of closely spaced small holes 17 as shown in Fig. 4, thereby dividing the piece into the sections 14′. The small piece of steel may then be welded to the body in the same manner as is described above. The resulting weld is entirely satisfactory. Furthermore the product is stronger than where slots are employed as the holes do not weaken the body piece as much.

From the foregoing description, it will be seen that the present invention comprises an article such as a tool consisting of two pieces of metal integrally joined by a series of spot welds, the smaller piece of one grade of steel being welded to the larger piece or stock of another or cheaper grade of steel. The specific electrical resistance of high speed or similar alloy steel is greater than that of carbon or cheaper alloy steels. Because of this property, the current passing through the pieces tends to heat the low grade steel first, where the slots of my invention are not employed. Moreover in cases where it is desired to weld a small piece of metal to a larger piece, the small piece heats first and burns before the large piece reaches a welding heat. My invention therefore is particularly applicable where it is desired to join two pieces of different electrical resistances by a series of spot welds, or where the pieces are of different sizes. It is to be understood however that the invention is not limited to these two cases or a combination of them, but is applicable to many other cases within the scope of the appended claims.

Having thus described the invention what is claimed as new and desired to be secured by Letters Patent is:

1. An article of manufacture comprising a machinery steel body having a seat at one end thereof with a transverse slot, and a piece of high speed steel on said seat extending across said slot and welded to said body.

2. A tool comprising a steel stock having a slot therein, and a piece of a different grade of steel welded to said stock extending across said slot.

3. A tool comprising a steel stock having a slot therein, a piece of high speed steel welded to said stock extending over said slot, and a filler in said slot.

4. A tool comprising two metal pieces having different electrical resistances, the piece having the lower resistance formed with a slot therein and the other piece integrally secured to the slotted piece and extending transversely to the slot.

5. An article of manufacture comprising a metal body having a portion divided into sections, and a piece of different kind of metal welded to said sections.

6. A tool comprising a steel stock having a slot therein, a piece of high speed steel welded to said stock extending over said slot, and a filler in said slot welded to the stock.

7. An article of manufacture comprising a steel body having a slot therein and a piece of alloy steel welded to said body extending across said slot.

8. An article of manufacture comprising a metal body having a slot therein and a piece of a different grade of the same metal welded to said body extending across said slot.

9. An article of manufacture comprising a body of low grade steel having a slot therein and a piece of higher grade steel welded to said body extending across said slot.

In testimony whereof I affix my signature.

EVRAH C. LIPPS